UNITED STATES PATENT OFFICE.

RICHARD D. A. PARROTT, OF GREENWOOD IRON WORKS, NEW YORK.

COMPOSITION FOR MINERAL WOOL.

SPECIFICATION forming part of Letters Patent No. 372,486, dated November 1, 1887.

Application filed September 25, 1886. Serial No. 214,566. (No specimens.)

*To all whom it may concern:*

Be it known that I, RICHARD D. A. PARROTT, of Greenwood Iron Works, in the county of Orange and State of New York, have invented a new and Improved Composition for Mineral Wool, of which the following is a full, clear, and exact description.

The object of my invention is to furnish a cheap and readily-manipulated composition for the manufacture of mineral wool.

My improved composition consists in the following ingredients combined in about the proportions stated, viz: feldspar, thirty-three and one-third parts; lime, sixty-six and two-thirds parts. These ingredients I place in a cupola-furnace and fuse by means of any available fuel—such as anthracite coal, coke, charcoal, or fuel-gas; but I preferably employ fuel containing little or no sulphur—such as charcoal or fuel-gas—as the product, when free from sulphur, is superior to that containing sulphur. When the ingredients are thoroughly melted and mixed together, I discharge them from the cupola-furnace in a small stream and bring a jet of steam or compressed air to act upon the stream of melted material, blowing it out into a fibrous mass.

By the term "feldspar" I mean to include the whole class of feldspars, viz: potash-feldspar or orthoclase, soda-feldspar or albite, and potash-lime-soda-feldspar, or oligoclase; and by the term "lime" I mean to include lime, carbonate of lime or marble and shells, and carbonate of lime and magnesia or dolomite.

I am aware that glass has been made of the materials used by me, but with different proportions; but the glass produced from such materials in such proportions is unfit for use in the manufacture of mineral wool. The materials used in the proportions stated herein will produce a fine quality of mineral wool, while they are totally unfit for the manufacture of glass.

Having thus fully described my invention, I claim as new and desire to secure by Letters Patent—

A composition for the manufacture of mineral wool, the same consisting of feldspar, thirty-three and one-third parts, and lime, sixty-six and two-thirds parts, the said materials being combined by fusion, as herein specified.

RICHARD D. A. PARROTT.

Witnesses:
ARTHUR H. SMITH,
JOHN F. BUGGY.